Dec. 24, 1940.　　　T. W. THIRLWELL　　　2,226,082
DIRECTION SIGNAL SWITCH
Filed Jan. 20, 1939　　　2 Sheets-Sheet 1
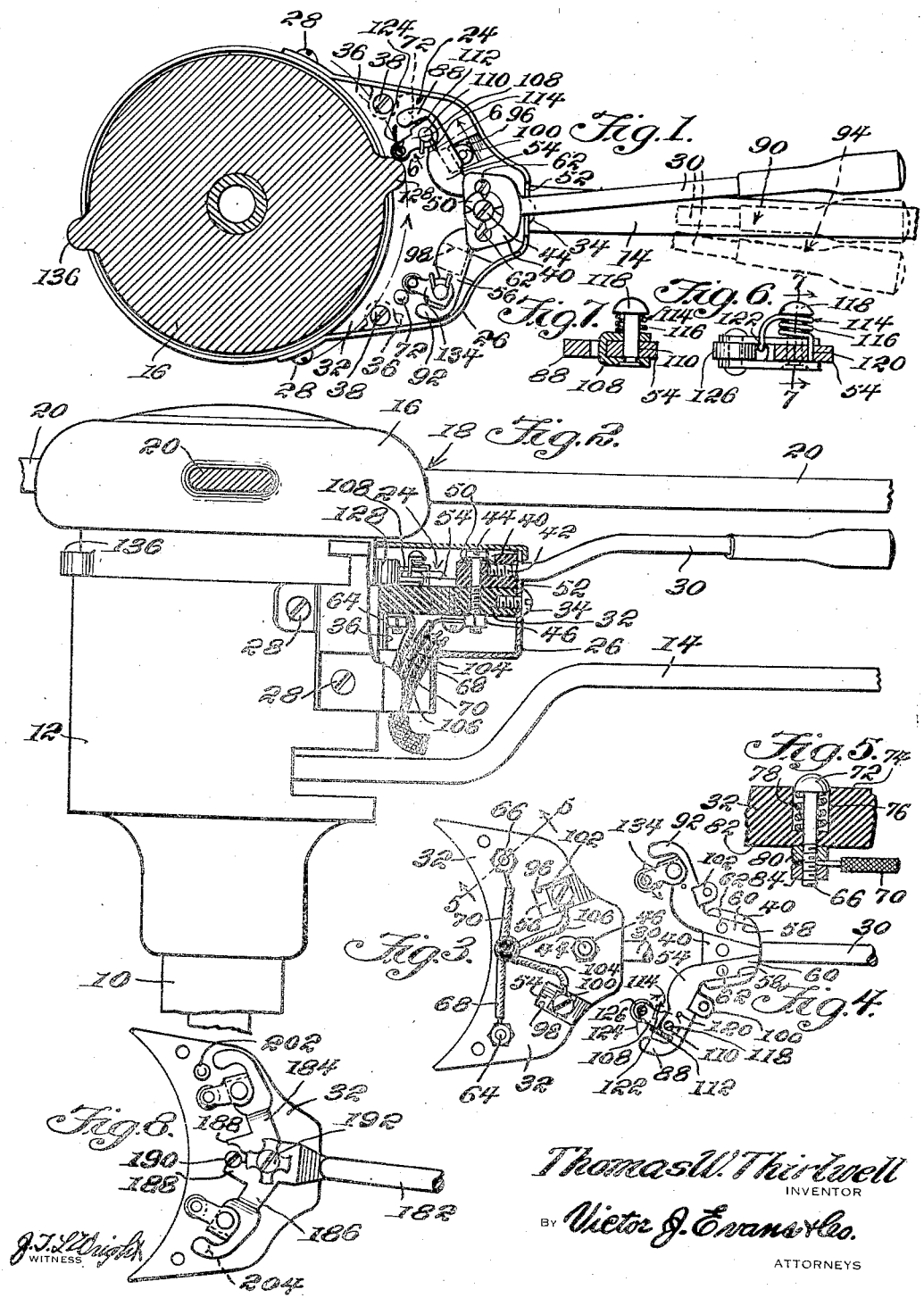

Dec. 24, 1940.                T. W. THIRLWELL                2,226,082
                           DIRECTION SIGNAL SWITCH
                            Filed Jan. 20, 1939            2 Sheets-Sheet 2
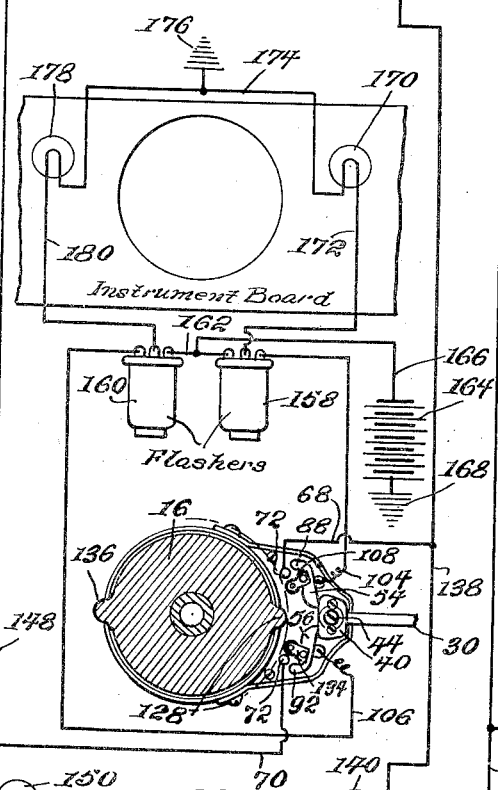
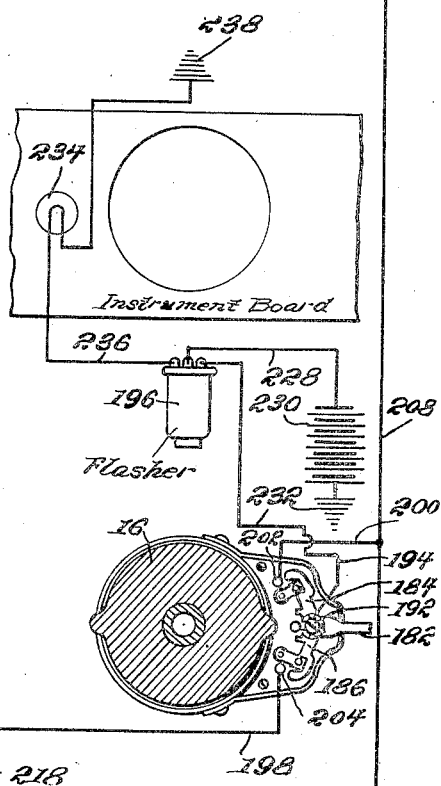
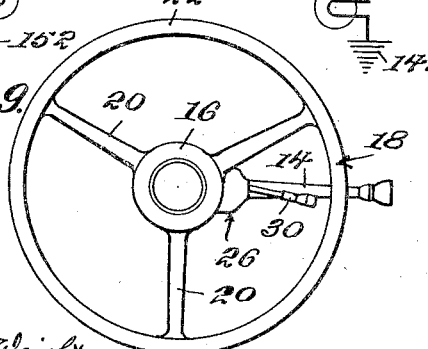
Thomas W. Thirlwell
INVENTOR Patented Dec. 24, 1940

2,226,082

UNITED STATES PATENT OFFICE 2,226,082

DIRECTION SIGNAL SWITCH

Thomas W. Thirlwell, Mount Vernon, Ohio

Application January 20, 1939, Serial No. 252,035

2 Claims. (Cl. 200—59)

My invention relates to automotive vehicles, and has among its objects and advantages the provision of an improved direction signal switch.

An object of my invention is to provide a direction signal switch of a semi-automatic type adapted for operation in conjunction with the steering wheel of the vehicle. The switch is characterized by a single manually operable switch element for closing the circuit through a selective signal and I provide an operable connection between the steering wheel and the switch element for returning the latter to a neutral position through movement of the steering wheel in a predetermined direction. The switch is designed to facilitate association with standard steering wheel equipment, and the single switch lever is arranged to be located directly underneath the steering wheel so as to be readily accessible for manipulation purposes. I design the switch structure and its lever in such manner as to facilitate location of the lever between the wheel and the steering wheel gear shift lever of modern vehicles. Steering wheel gear shift levers are of such length as to project beyond the perimeter of the steering wheel. I fashion the switch lever of such length as to terminate short of the perimeter of the steering wheel so as to lend distinction to the switch lever.

In the accompanying drawings:

Figure 1 is a top plan view of my switch structure in association with the hub of a steering wheel;

Figure 2 is a side elevational view of the structure of Figure 1, with the switch mechanism illustrated in section;

Figure 3 is a bottom plan view of a portion of the switch mechanism;

Figure 4 is a fragmentary detail view of the switch lever;

Figure 5 is a sectional view along the line 5—5 of Figure 3;

Figure 6 is a sectional view along the line 6—6 of Figure 1;

Figure 7 is a sectional view along the line 7—7 of Figure 6;

Figure 8 is a top plan view of a portion of a slightly different form of switch;

Figure 9 is a plan view of a steering wheel illustrating the relation between the switch lever, the gear shift lever and the steering wheel;

Figure 10 is a diagrammatic view of the electric circuit associated with the switch structure illustrated in Figures 1 to 7, inclusive; and Figure 11 is a diagrammatic view of the electric circuit associated with the switch structure of Figure 8.

In the embodiment selected to illustrate my invention, I make use of a steering column 10 of the type employed in automotive vehicles, particularly automobiles. Figure 2 illustrates the column 10 as terminating in a housing 12 at its upper end for association with the steering wheel gear shift lever 14. Hub 16 of the steering wheel 18 is mounted adjacent the upper end of the housing 12. Figure 9 illustrates the wheel 18 as including the usual spokes 20 which interconnect the hub 16 with the rim 22, and the gear shift lever 14 projects beyond the rim 22. The structure so far described is old and well known in the art.

Referring to Figures 1 and 2, my switch mechanism 24 is enclosed within a housing 26 anchored to the housing 12 through the medium of screws 28. Housing 26 is located underneath the steering wheel 18, and the switch lever 30 is positioned between the steering wheel and the gear shift lever 14, with the switch lever 30 terminating short of the rim 22, as illustrated in Figure 9.

Inside the housing 26 I mount a body 32 of insulating material, which body is contoured to fit tightly against the inner face of the housing 26 and against the outer face of the housing 12 when viewed according to Figure 1. Screws 34 pass through the wall of the housing 26 and are threaded into the body 32 for anchoring the latter. Housing 26 is also provided with lugs 36 abutting the bottom face of the body 32 and are provided with threaded openings for the reception of screws 38 which pass through the body 32 and draw the same firmly against the lugs for lending additional support to the body, see Figures 1 and 10.

Upon the body 32 I pivotally connect a head 40 of insulating material into which the threaded end 42 of the switch lever 30 is anchored. Head 40 is bored for the reception of a bolt 44 which is threaded into the body 32 and is provided with a lock nut 46 tightened against the lower face of the body 32. Between the head 44 of the bolt and the head 40 I interpose a spring washer 50 which is effective for restraining the head 40 from accidental movement about the axis of the bolt 44. Housing 26 includes an opening 52 of sufficient size to accommodate the necessary pivotal movement of the switch lever 30.

To the head 40 I connect arms 54 and 56, which arms are arranged in diverging relation and arranged to lie adjacent the upper face of the body 32. Head 40 is grooved at 58 for receiving the ends 60 of the arms, which ends are fixedly related to the head 40 by screws 62. The two arms 54 and 56 are spaced apart, as illustrated in Figure 4. The two arms move as a unit when the lever 30 is pivoted about the axis of the bolt 44.

Body 32 carries two terminal screws 64 and 66 for connection with wires 68 and 70, respectively. Figure 5 illustrates the specific construction of the terminal screw 66, which is also illustrative of the terminal screw 64. Screw 66 is provided with a rounded head 72 which protects partly above the upper face 74 of the body 32 and moves freely in the bore 76 in the body. Between the head 72 and the bottom of the bore 76 I interpose a compression spring 78 which normally urges the head 72 to the position of Figure 5, which position is determined by engagement of the nut 80 with the lower face 82 of the body 32. Wire 70 is fixedly connected with the terminal screw 66 between the nut 80 and a second nut 84. The screw slides freely in the bore 86 in the body 32.

Finger 54 includes an end 88 arranged to be moved into engagement with the head 72 of the terminal screw 66 when the switch lever 30 is moved from its neutral position 90 to the full line illustration of Figure 1. Similarly, finger 56 includes an end 92 arranged to be moved into engagement with the head 72 associated with the terminal screw 64 when the switch lever 30 is moved to the second position 94. Ends 88 and 92 depress their respective terminal screws 64 and 66 so that the heads 72 are urged into effective contacting relation with the arms 54 and 56 through the medium of the springs 78.

Body 32 is provided with two openings 96 and 98 through which lugs 100 and 102, respectively, extend for connection with wires 104 and 106, respectively, see Figure 10. Lugs 100 and 102 engage the walls of their respective openings 96 and 98 for limiting the degree of pivotal movement of the switch lever 30 when shifted from its neutral position to either of its circuit closing positions.

Finger 54 is provided with a breaker arm 108 which is pivotally connected thereto at 110 and urged to the normal position of Figure 1, at which time its end 112 engages the finger 54. A spring 114 is convoluted at 116 for reception of the bolt 118, and one end of the spring is anchored at 120 to the finger 54 and its other end is anchored at 122 to the breaker arm 108. The breaker arm may be pivoted in the direction of the arrow 124 of Figure 1 about the axis of the pivot 110. Breaker arm 108 carries a wheel 126 of insulating material which is moved into the path of a lug 128 carried by the steering wheel hub 16 when the switch lever 30 is moved to the full line position of Figure 1. Similarly, finger 56 carries a breaker arm 134 identical with the breaker arm 108. Wheel hub 16 includes a second lug 136 which is positioned diametrically opposite the lug 128.

Referring to Figure 10, wire 68 is connected with a wire 138 which leads to the rear direction indicating lamp 140 grounded at 142. Wire 138 also leads to the right front direction signal lamp 144 which is grounded at 146. Wire 70 is connected with a wire 148 which leads to the left rear signal lamp 150 grounded at 152. Wire 148 also leads to the front direction signal lamp 154 grounded at 156. Wire 104 leads to a flasher 158 which in turn is connected with a flasher 160 through the medium of a wire 162. Flashers 158 and 160 are of the type set forth in Patent 1,979,349 issued November 6, 1934. Wire 162 is connected with the battery 164 through the medium of a wire 166, and the battery is grounded at 168. Flasher 158 is connected with a pilot lamp 170 through the medium of a wire 172, and the pilot lamp is connected with a wire 174 which is grounded at 176. Similarly, the flasher 160 is connected with a pilot lamp 178 through the medium of a wire 180, and the lamp 178 is connected with the wire 174.

From the foregoing description of the various parts of the device, the operation thereof will be readily understood. In signalling an intended right turn, switch lever 30 is moved from its neutral position 90 to the full line position of Figure 1, at which time the element 88 is brought into electrical relation with the head 72 of the terminal screw 64. The circuit will then be closed as follows: from battery 164, wire 166, wire 162, flasher 158, wire 104, wire 68 and to the lamps 140 and 144 for indicating an intended right turn. Lamp 140 is located at the rear of the car and the lamp 144 is located so as to be visible from positions in advance of the vehicle. At the same time, the pilot lamp 170 will be illuminated for indicating to the operator of the vehicle that the signal system is in operation. Flasher 158 will function to alternately brighten and dim the lamps so as to attract attention thereto.

With the switch arm 30 positioned according to Figure 1, switch lever 30 may be moved in a clockwise direction for consummating a right turn relatively to the breaker arm 108 because of its pivotal mounting. However, rotation of the switch lever 30 in a counter-clockwise direction, as when bringing the vehicle into the straight stretch after having completed a right turn, the lug 128 or 136 will engage the breaker arm 108 and pivot the switch lever 30 to its neutral position 90 for breaking the circuit through the right signal lamps. In the neutral position of the lever 30, switch lever 30 may move freely relatively to both breaker arms 108 and 134, since the breaker arms are located in the clear of both lugs.

In signalling an intended left turn, the switch lever 30 is moved to its dotted line position 94, at which time the element 92 engages the terminal screw 66. At this time the circuit is closed as follows: from battery 164, wire 166, wire 162, flasher 160, wire 106, wire 70 and the left signal lamps 150 and 154. Lamp 154 is located in the rear of the vehicle in the same manner as lamp 140, and lamp 154 is located so as to be visible in advance of the vehicle in the same manner as the lamp 144. It will thus be seen that the lamps 150 and 154 will be energized, and that the flasher 160 will alternately brighten and dim the two lamps for attraction purposes. In addition, the pilot lamp 178 will be energized.

My switch is located in an advantageous position in close relation with the steering wheel 18. The switch which controls the right and left signal lamps is characterized by a single lever, which lever is located in operating proximity with the steering wheel. The switch lever is located between the steering wheel gear shift lever 14 and the steering wheel 18, and the switch lever is somewhat shorter than the gear shift lever so as to readily distinguish the two. It will thus be seen that I have provided a switch mechanism particularly adapted to steering wheel devices of modern design, and in which the switch mechanism is characterized by a simple and efficient structure. In addition, the right and left circuits are manually closed, but the switch mechanism functions in such manner as to automatically break the circuits as their respective turns are completed.

Figure 8 illustrates a slightly different form of construction in which the switch lever 182 and its associated mechanism is different only in that the fingers 184 and 186 are integral, which correspond to the fingers 54 and 56, are provided with projections 188 spaced to accommodate a stop screw 190 which cooperates with the projections 188 to limit the position of the switch arm 182 in either of its extreme circuit closing positions. At the same time, the pivot screw 192 for the lever 182 serves as a connection for a wire 194 which connects with a flasher 196. The wires 198 and 200 are respectively connected with terminal screws 202 and 204 corresponding to the terminal screws 64 and 66. Wire 200 is connected with a wire 208 which connects with the right rear signal lamp 210 grounded at 212. Wire 208 also connects with the right front signal lamp 214 which is grounded at 216. Wire 198 connects with a wire 218 which leads to the left rear signal lamp 220 grounded at 222. Wire 218 also connects with the left front signal lamp 224 grounded at 226. Flasher 196 is connected with a wire 228 which leads to the battery 230 grounded at 232. At the same time, the flasher is connected with a pilot lamp 234 through the medium of a wire 236, and the pilot lamp is grounded at 238.

Flasher 196 is of the same type as the flashers 158 and 160. The circuit of Figure 11 differs from the circuit of Figure 10 principally in the fact that I employ one flasher only. Also, one pilot lamp only is necessary.

What is claimed is:

1. The combination with the steering column and steering wheel shaft of an automobile, of a casing secured to the column below the wheel and having a curved open inner face opposite the steering column, an insulating plate secured within the casing intermediate its upper and lower ends, an insulating head pivotally mounted on the upper face of the insulating plate and having an operating handle secured thereto and extending outwardly through a slot in the casing, a contact plate rigidly carried by the upper face of the head and having two spaced inwardly extending arms adapted to engage a pin carried by the insulating plate for limiting the movement of the head in both directions, contact plates carried by the upper face of the insulating plate adjacent the inner edge, outwardly extending and inwardly curved arms carried by the plate rigidly carried by the head, and projections carried by opposite faces of the steering wheel shaft for engaging the ends of the outwardly extending arms to shift the same to neutral position.

2. The combination with a steering column and steering wheel shaft of an automobile, of a casing secured to the column below the wheel and having a curved open inner face opposite the steering column, an insulating plate secured within the casing intermediate its upper and lower ends, an insulating head pivotally mounted on the upper face of the insulating plate and having an operating handle secured thereto and extending outwardly through a slot in the casing, a contact plate rigidly carried by the upper face of the head and having two spaced inwardly extending arms adapted to engage a pin carried by the insulating plate for limiting the movement of the head in both directions, contact plates carried by the upper face of the insulating plate adjacent the inner edge, outwardly extending and inwardly curved arms carried by the plate rigidly carried by the head and adapted to engage the contact plates carried by the insulating plate, links pivotally connected to the outer ends of the arms and outwardly spring held, rollers carried by the inner ends of the arms, and projections carried by opposite faces of the steering wheel shaft for engaging the rollers and adapted to shift the same to neutral position.

THOMAS W. THIRLWELL.